(No Model.) 3 Sheets—Sheet 1.
J. K. P. SHELTON.
STEERING AND BRAKE DEVICE.
No. 351,844. Patented Nov. 2, 1886.
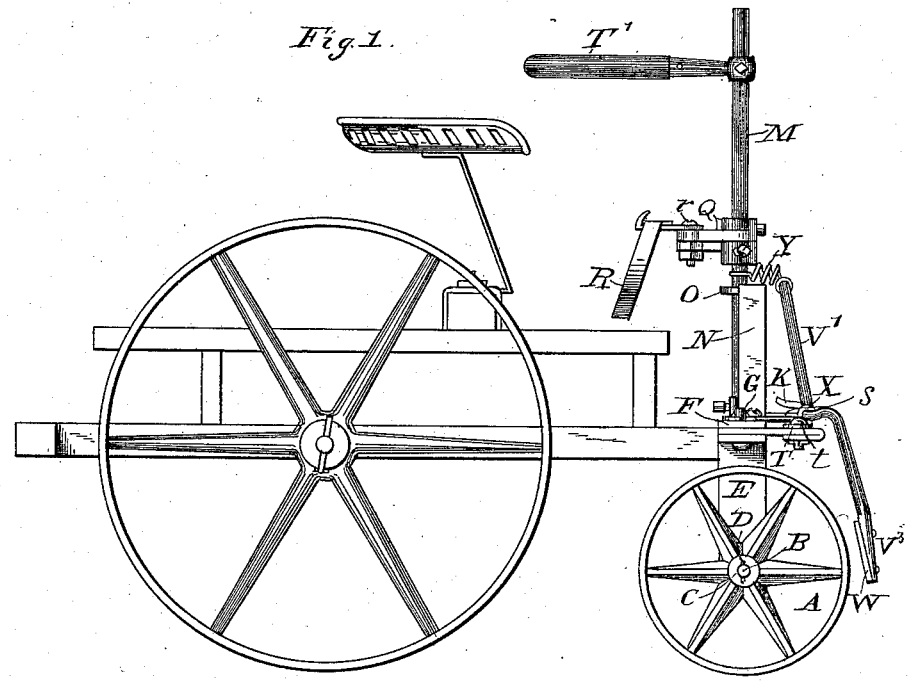
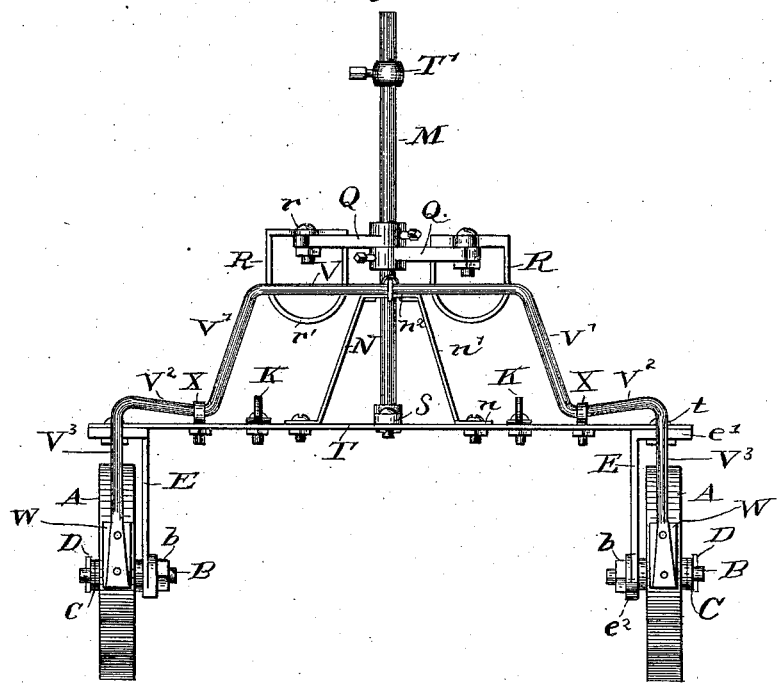
Witnesses:
Inventor:

(No Model.) 3 Sheets—Sheet 2.

J. K. P. SHELTON.
STEERING AND BRAKE DEVICE.

No. 351,844. Patented Nov. 2, 1886.

Witnesses:
J. C. Turner
J. S. Barker

Inventor:
James K. P. Shelton
by Charles King
Wm B King atty (No Model.) 3 Sheets—Sheet 3.

J. K. P. SHELTON.
STEERING AND BRAKE DEVICE.

No. 351,844. Patented Nov. 2, 1886.

Witnesses:
J. C. Turner
J. S. Barker.

Inventor.
James K. P. Shelton.
by Charles King
& Wm B King attys

UNITED STATES PATENT OFFICE.

JAMES K. P. SHELTON, OF GASTON, ALABAMA.

STEERING AND BRAKE DEVICE.

SPECIFICATION forming part of Letters Patent No. 351,844, dated November 2, 1886.

Application filed June 12, 1886. Serial No. 204,995. (No model.)

*To all whom it may concern:*

Be it known that I, JAMES K. P. SHELTON, a citizen of the United States, residing at Gaston, in the county of Sumter and State of Alabama, have invented certain new and useful Improvements in Steering and Brake Devices for Farm and Road Machines, of which the following is a specification, reference being had therein to the accompanying drawings.

This invention relates to new and useful improvements in devices for supporting, steering, and braking (either or all) machinery and vehicles of the various sorts used on ordinary roads, or for farming purposes, &c.—such as cultivators, planters, cotton-choppers, road-graders, harvesters, and others.

Figure 3:
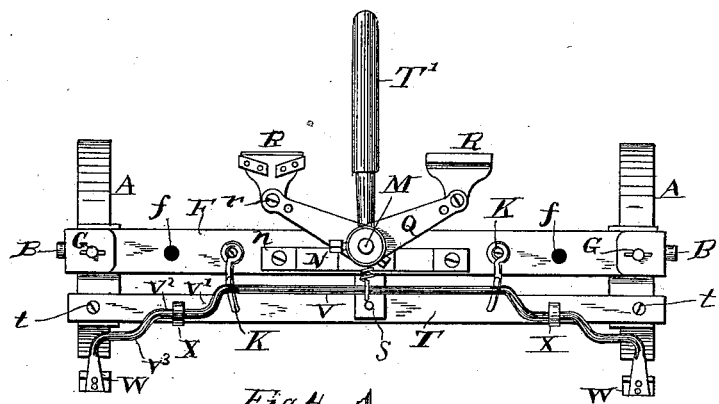
Figure 4:
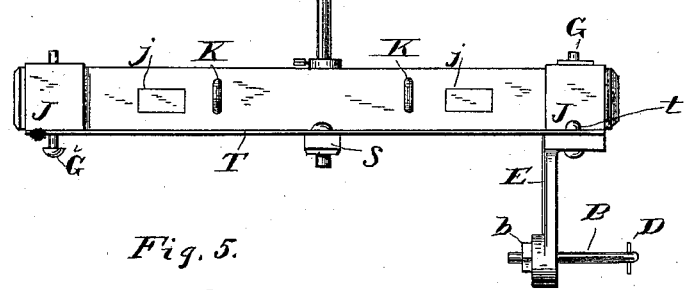
Figure 5:
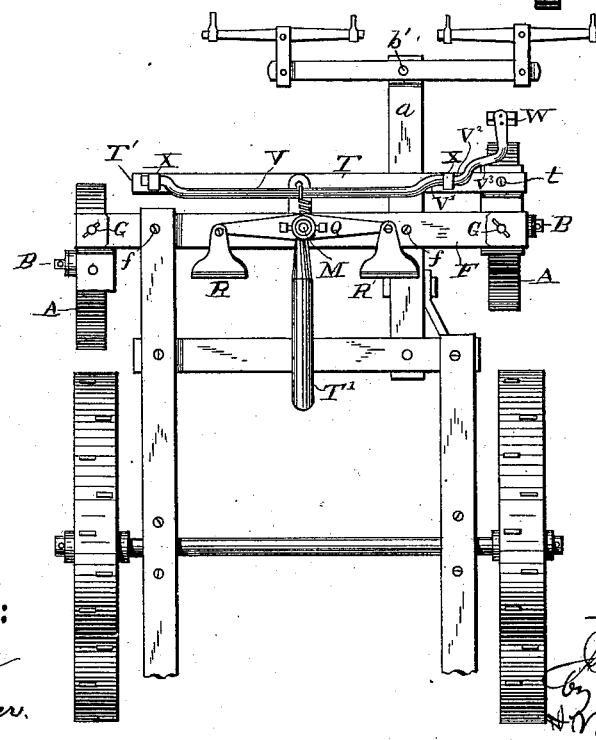
Figure 6:
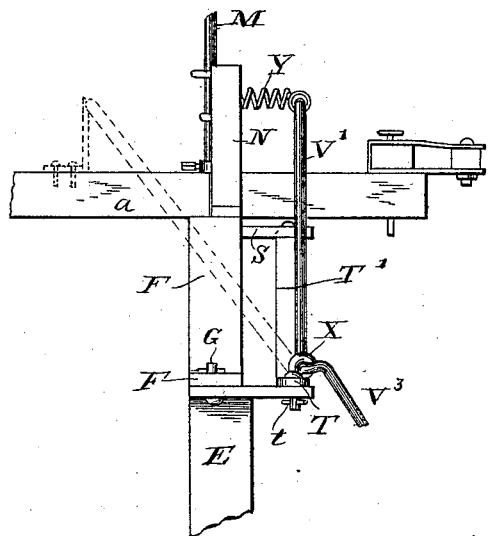
Figure 7:
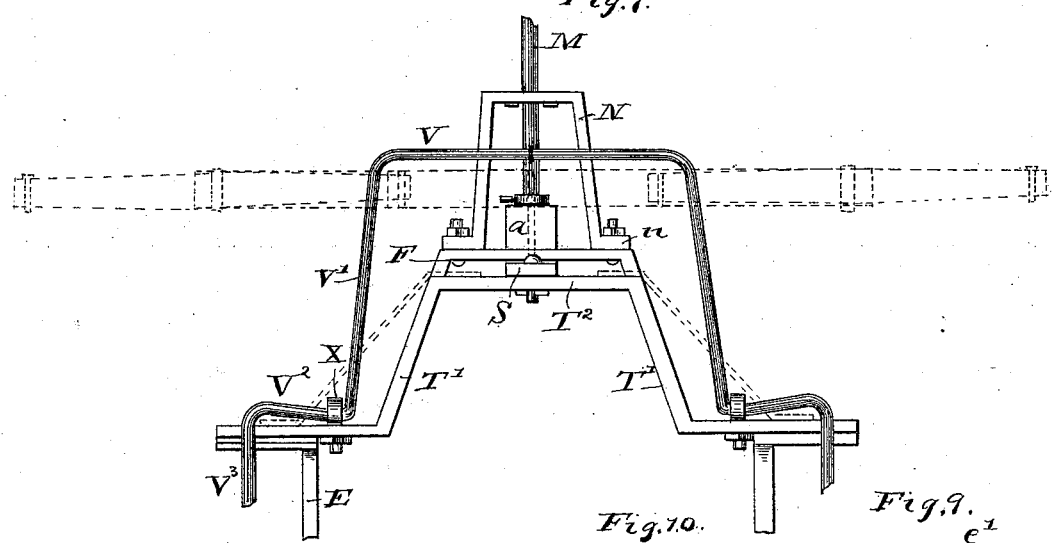
Figure 8:
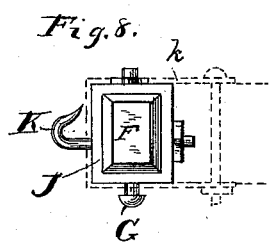
Figure 11:
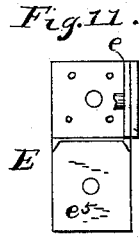
Figure 10:
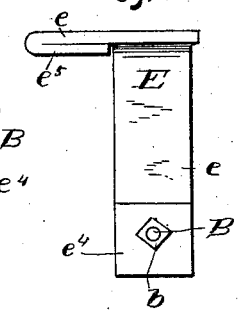
Figure 9:
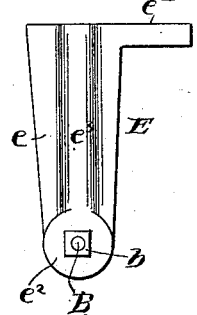

Figure 1 is a side elevation of a mechanism embodying my improvements. Fig. 2 is a front view of the same. Fig. 3 is a top plan view. Fig. 4 shows a modification in respect to the cross-girt. Fig. 5 is a top plan illustrating the manner of applying my invention to a mower or harvester. Fig. 6 is a side elevation of the form of the mechanism having the parts near the central longitudinal line elevated. Fig. 7 is a front view of that shown in Fig. 6. Fig. 8 is an end view of that in Fig. 4. Figs. 9, 10, and 11 show details.

To those acquainted with the construction and operation of machines more or less similar to those above mentioned, it is well known that it is very desirable to have a simple mechanism by which the driver or operator can, either with his feet or his hands, (or both,) steer the machine—that is, guide it in any desired direction.

The object of the present invention is to provide a simple but efficient mechanism by which such machines can be guided with ease and precision. I prefer to employ a short tongue or draft-pole, so that the easy and accurate turning of the machine shall not be interfered with by fences, ditches, or other obstructions. When the mechanism is applied to a machine of the planting or cultivating classes, the latter can be readily caused to follow curved or crooked rows, and when a short tongue is employed, as above described, the horses are relieved from the blows, pressure, and weight of the tongue.

Referring to the drawings, A A represent wheels. These in most cases are situated at or near the front end of the machine to which they are applied. They can be used to support more or less of the weight, or may be depended on only for the purpose of steering.

It will be understood that the other transporting-wheels can be of any preferred form.

The wheels A A are connected with movable hangers by means of the axles B B. These axles are preferably made separately from the hangers, and the latter are provided with apertures to receive them, the axles being threaded and provided with nuts $b$ for clamping them. The wheel can be held in place by linchpins D, with washers C.

The hangers E E may be made of cast-iron, bar-iron, or of other suitable material, and of such width, thickness, and weight as to meet the requirements in each case. When made of cast-iron, I at present prefer them to be of the shape shown in Figs. 2 and 9, there being a main arm, $e$, a top plate, $e'$, and an eye, $e^2$, to receive the axle. It can be strengthened by a vertical web, $e^3$. Hangers of bar-iron are shown in Figs. 4, 10, and 11. In this case I prefer to bend parts of the bar back upon itself, so as to thicken and strengthen it, especially at points where bolts or other parts are to be passed through it.

$e^4$ indicates the lower end, bent up and back against the part $e$, there being thus provided sufficient depth of metal for the attachment of an axle.

$e^5$ indicates the backwardly-turned part of the top plate, $e'$, for receiving the vertical pivot-bolt G. This bolt secures the hanger or bracket to the frame.

The frame to which the wheels are attached contains a cross-girt, F, preferably, although some parts of the invention can be carried out without using such a girt. When employed, it may be made either of wood, as in Fig. 4, or of iron, as in Figs. 1, 2, 3, &c. Bar-iron can be used, and when it is the ends thereof can be advantageously turned back to increase the thickness of the metal, for the purposes above described in respect to the bar-iron hangers.

At $f f$ are apertures for receiving the bolts by which the girt F is secured to the frame; but it may be fastened in other ways. When the cross-girt is of wood, as in Fig. 4, the ends can be surrounded with iron bands J, to prevent wearing or splitting.

At $j$ are mortises through which pass the tenons of the longitudinal side beams.

$k$ $k$ are stirrup-bands, bolted to the side beams and surrounding the side girt, F.

L L represent the hooks by which can be attached the draft devices, a chain, or other suitable device.

It will be seen that the wheels A A and their brackets can oscillate more or less about the pivot bolts G.

With these parts I combine a steering mechanism constructed as follows: The brackets E E are connected by a steering-bar, T, this being pivoted at $t$ to the top plates, $e'$, of the hangers. This bar T can be moved to the right or to the left by a vertical shaft, M, which rises from the frame, and is provided with a handle, T', within reach of the driver or operator. At the lower end it is mounted in the cross-girt F. It is pivotally connected with the steering bar T by an arm, S. To hold the shaft firmly, I employ a standard or bracket, N, preferably formed of bar-iron, with footpieces $n$, bolted to the girt F, and having the rising parts $n'$ and the top bar, $n^2$. This bar has a bearing or holder, O, for retaining the shaft M.

To permit the driver or operator to steer with his feet, I combine with the shaft M stirrups R R, which are adjustably secured at $r$ to arms Q Q, these being fastened by set-screws to the shaft M. The arms Q can be adjusted around or vertically upon the shaft M, independently of each other. The stirrups R R incline backwardly and downwardly, and are provided with braces $r'$ for the balls of the driver's feet to rest against. The fastening at $r$ can be so adjusted as to permit the stirrups to accommodate themselves to the positions of the driver's feet.

It will be seen that when the shaft M is turned to the right or to the left by the hand or by the feet of the driver the steering-bar T will be correspondingly moved, and with it hangers E and wheels A. These steering-wheels are used, also, in braking the machine.

The brake shoes or blocks are represented at W W. They are carried by a brake lever or rod, which is preferably made of one piece of round iron bent to have the central top part, V, and on each side the inclined part V', the bearing-piece $V^2$, and the block-holding part $V^3$. This brake rod or lever is so shaped and arranged that the part V lies within easy reach of the driver's foot. X X are eyebolts, secured to the steering-bar T, and in which the brake lever or rod is loosely mounted. This lever can be arranged so that the top part shall lie in front of the shaft M, as in Figs. 1, 2, and 3; or behind said shaft, as in Fig. 6, dotted lines. In either case it may be actuated in one direction by a spring, as at Y; or it can be so disposed that its gravity shall return it.

It will be seen that the brake devices are supported upon and carried by the steering devices, thus causing the brake-shoes to follow the wheels as they are turned, so that they may be brought into contact with the latter even when their angle to the line of the main frame is inclined.

The parts above described, used for steering, can be readily arranged so that the machine can be turned on a short curve. To do this, it is merely necessary to place the pivot-bolt G of one of the hangers E in the front aperture of the hanger, and disconnect the hanger from the steering-bar T. Then the said hanger and its wheel will automatically take the necessary position for permitting a short turn. In machines where such turns are frequently necessary, one of the wheels A can be permanently arranged in the manner last described, and the steering bar can be united only with the other wheel. When the parts for steering are thus arranged, the brake devices can be easily modified to correspond, as will be seen by examining Fig. 5.

In Figs. 6 and 7 I have shown an arrangement of parts well adapted for use with cultivators to be employed with standing rows of plants. Here the girt F is elevated at the central part, and the parts attached thereto are correspondingly elevated. The standard N, which holds the shaft M, is supported on this higher part, and the steering-bar T is bent to have the upright parts T', and the upper part, $T^2$, to which the arm S is pivoted.

$a$, Figs. 6 and 7, represents a short tongue, which is connected to the girt F and extends back to permit its being secured properly to the frame. It is here shown situated on the central longitudinal line in said Figs. 6 and 7; but a tongue of this sort can be placed at one side of the center, if necessary, as shown in Fig. 5. The whiffletree-connection is shown at $b'$, it preferably extending forward from the tongue, so as to swing free. When a tongue and draft devices of this sort are employed, the machine can be easily guided and turned, and can be taken in close proximity to fences and other objects. In this figure I have shown the hanger E of one of the steering-wheels disconnected from the steering-bar T, the pin G, by which the wheel and its hanger are in this case pivoted to the frame of the machine, being passed through the front hole in the hanger—the one which, in the other drawings, is shown as receiving the pivot-pin $t$. When thus pivoted to the frame, this wheel acts as a caster, permitting the machine to be easily and very shortly turned. In such a construction as this the steering-bar T need not extend so far outward on the side of the machine opposite the wheel A, which acts as a caster, as shown at T', as it does on the other side, while the brake-shoe, and arm which carries it, may be also omitted from that side of the machine, as shown in the drawings.

In many respects the machine can be varied in construction, in whole or in part.

I am aware that it is common in machines of this character to provide them with a fifth-wheel, a single steering-wheel near the front end of the frame and directly in rear of the tongue, and that it is common to provide them with two steering-wheels mounted on a short axle, from the center of which rises a shaft or standard turning in the main frame, and having at its upper end a rearward-projecting steering-lever; but my machine differs materially from either of the foregoing constructions, and possesses many advantages over them. For instance, the use of a single central steering-wheel results in the machine making three tracks—one by the central wheel and two by the main supporting-wheels—whereas in my construction the steering-wheels may be made to substantially track with the supporting-wheels, thus avoiding all danger of the steering-wheels digging up or cutting down the plants to be cultivated, and which the machine is intended to straddle. An important advantage possessed by my machine over the second class above referred to is this. When two steering-wheels are mounted on a single centrally-pivoted axle, although the machine may eventually straddle the rows to be cultivated, yet, if the steering-wheels are arranged substantially in line with the rear supporting-wheels, it is impossible (on account of its length) to turn the axle of the steering-wheels to an acute angle with the line of draft without thrusting one of these wheels a long distance in front of the main frame, thus interfering with the horses, and at the same time thrusting the other of the steering-wheels a long distance in rear of the front of the main frame, which, with many constructions, would be impossible because of the presence of other operative parts; but in my invention both steering-wheels being mounted close to their vertical pivots about which they swing, their axles can be turned to a quite acute angle to the line of draft without their ends projecting either in front or in rear of the girt or cross-bar at the front end of the main frame. In fact, it will be seen by an examination of Fig. 3 that each steering-wheel is practically swiveled upon its pivot G, and hence swings substantially about its own center when shifted from one position to another for the purpose of steering.

What I claim is—

1. In a machine of the nature described, the combination, with the main frame, of the supporting-wheels, the steering-wheels, the hangers E E, independently pivoted to the cross-girt F near the opposite sides of the machine, the steering-bar connecting the hangers, and means for operating the steering-bar to change the angles of the steering-wheels relative to the line of draft, substantially as set forth.

2. In a machine of the character described, the combination, with the main frame, of the girt F, the wheels A, the hangers E, the steering devices, and the brake devices supported on the steering devices, substantially as set forth.

3. The combination, with the main frame, of the girt F, the wheels A, the hangers E, the steering devices, the brake-blocks which engage with the steering-wheels, and means for operating the brakes, substantially as described.

4. The combination, with the girt F, the wheels A, the independently-pivoted hangers E, and the steering-bar T, connecting the hangers of the shaft M, supported on girt F, and the arm S, connecting the shaft with the steering-bar, substantially as described.

5. In a machine of the nature described, the combination, with the main frame, of the steering-wheels, the vertical shaft M, connected with said wheels, arms Q Q, carried by shaft M and projecting on opposite sides thereof, and stirrups carried by said arms and adapted to receive the driver's feet, substantially as set forth.

6. In a machine of the nature described, the combination, with the main frame, of the steering-wheels, the steering-shaft M, the stirrups for the driver's feet connected with said shaft, and means for adjusting said stirrups around the shaft, substantially as set forth.

7. The combination, with the main frame having a short tongue, and the flexible or loosely-mounted draft devices extending forward from said tongue, of the steering-wheels, the means for guiding said wheels, and the brake-blocks which engage with said wheels, supported from the steering devices, substantially as set forth.

In testimony whereof I affix my signature in presence of two witnesses.

JAMES K. P. SHELTON.

Witnesses:
 A. E. MOORE,
 P. Y. MITCHELL.